US012759690B2

(12) United States Patent
Keck et al.

(10) Patent No.: US 12,759,690 B2
(45) Date of Patent: Oct. 13, 2026

(54) VEHICLE CABIN SIDEWALL-TO-FLOOR COUPLING ASSEMBLY AND METHOD OF ASSEMBLY

(71) Applicant: THE BOEING COMPANY, Chicago, IL (US)

(72) Inventors: Russell W. Keck, Seattle, WA (US); Gregory A. Tubbs, Marysville, WA (US)

(73) Assignee: THE BOEING COMPANY, Chicago, IL (US)

( * ) Notice: Subject to any disclaimer, the term of this patent is extended or adjusted under 35 U.S.C. 154(b) by 300 days.

(21) Appl. No.: 17/818,056

(22) Filed: Aug. 8, 2022

(65) Prior Publication Data

US 2023/0166826 A1 Jun. 1, 2023

Related U.S. Application Data

(60) Provisional application No. 63/264,625, filed on Nov. 29, 2021.

(51) Int. Cl.
*B64C 1/06* (2006.01)
*F16B 5/06* (2006.01)

(52) U.S. Cl.
CPC ................ *B64C 1/066* (2013.01); *F16B 5/06* (2013.01)

(58) Field of Classification Search
CPC ... B64C 1/066; B64C 1/069; B64C 2001/009; F16B 5/06
See application file for complete search history.

(56) References Cited

U.S. PATENT DOCUMENTS 4,739,955 A * 4/1988 Aquino .................. B64C 1/403 D12/345
4,799,631 A 1/1989 Humphries
2012/0210545 A1* 8/2012 Koeling .................. B63B 32/57 24/595.1
2013/0320140 A1 12/2013 Cheung
2014/0291447 A1* 10/2014 Goehlich ................ B64C 1/061 244/119

(Continued)

OTHER PUBLICATIONS

Extended European Search Report for EP 22209904.6-1004, dated Mar. 29, 2023.

(Continued)

*Primary Examiner* — Joshua D Huson
*Assistant Examiner* — Anna L. Gordon
(74) *Attorney, Agent, or Firm* — Carroll, Hoette & Butscher, LLC; Josef L. Hoffmann

(57) ABSTRACT

An assembly for use in a vehicle cabin includes a floor coupling structure and a sidewall coupling structure. The floor coupling structure includes a floor interface portion and a sidewall interface portion that extends transversely relative to the floor interface portion. The floor interface portion is configured to attach the floor coupling structure to a floor assembly of an internal cabin of a vehicle. The sidewall coupling structure has at least one friction-fit portion and a sidewall attachment section. The sidewall attachment section is configured to couple the sidewall coupling structure to a sidewall assembly of the internal cabin. The at least one friction-fit portion is configured to couple to the sidewall interface portion of the floor coupling structure.

20 Claims, 11 Drawing Sheets

(56) References Cited

U.S. PATENT DOCUMENTS

| | | | | |
|---|---|---|---|---|
| 2015/0274304 | A1* | 10/2015 | Gray | B64D 45/00 244/119 |
| 2017/0129581 | A1* | 5/2017 | Perkins | B64C 1/066 |
| 2020/0290720 | A1 | 9/2020 | Dibowski | |
| 2024/0093506 | A1* | 3/2024 | De Rick | E04F 13/0894 |

OTHER PUBLICATIONS

Extended European Search Report for corresponding EP Application No. 25220933.3 mailed on Jan. 28, 2026 (5 pages).

* cited by examiner

VEHICLE CABIN SIDEWALL-TO-FLOOR COUPLING ASSEMBLY AND METHOD OF ASSEMBLY

CROSS-REFERENCE TO RELATED APPLICATIONS

This application relates to and claims priority benefits from U.S. Provisional Patent Application No. 63/264,625, filed Nov. 29, 2021, which is hereby incorporated by reference in its entirety.

FIELD OF THE DISCLOSURE

Embodiments of the present disclosure generally relate to assemblies and methods to secure sidewall structures to floor panels, such as may be used within internal cabins of vehicles.

BACKGROUND OF THE DISCLOSURE

Vehicles, such as aircraft, have internal cabins that contain crew, passengers, and/or cargo. The internal cabins include sidewall assemblies that extend from a floor structure. As the vehicle travels, forces are transferred between the sidewall assemblies and the floor structure. For example, during flight, torsional forces exerted on the fuselage of an aircraft cause the sidewall assemblies to move relative to the floor structure, which exerts loads on connector members that couple the floor structure to the sidewall assemblies. The loads cause the connector members to flex to absorb the relative movement. The bending of the connector members over time, or flex cycling, can degrade and cause premature failure of the connector members, necessitating maintenance to repair and/or replace.

Furthermore, the connector members may be secured to the floor structure and the sidewall assembly using fasteners. The installation and maintenance processes may require the use of tools to manipulate the fasteners, which may be time intensive and manually demanding.

SUMMARY OF THE DISCLOSURE

A need exists for an assembly and a method for extending the operational lifetime of connector members between floor structures and sidewall assemblies within vehicle internal cabins, without sacrificing integrity of the connector members or increasing weight of the vehicle. A need also exists for an assembly and method to increase the efficiency and reduce the complexity of installing and removing the connector members between the floor structures and the sidewall assemblies.

With those needs in mind, certain embodiments of the present disclosure provide an assembly for use in a vehicle cabin. The assembly includes a floor coupling structure and a sidewall coupling structure. The floor coupling structure includes a floor interface portion and a sidewall interface portion that extends transversely relative to the floor interface portion. The floor interface portion is configured to attach the floor coupling structure to a floor assembly of an internal cabin of a vehicle. The sidewall coupling structure has at least one friction-fit portion and a sidewall attachment section. The sidewall attachment section is configured to couple the sidewall coupling structure to a sidewall assembly of the internal cabin. The at least one friction-fit portion is configured to couple to the sidewall interface portion of the floor coupling structure.

Certain embodiments provide an aircraft that includes a fuselage, a sidewall assembly, a floor panel, a floor coupling structure, and a sidewall coupling structure. The fuselage has an internal cabin, and the sidewall assembly and the floor panel are within the internal cabin. The floor coupling structure is attached to the floor panel. The sidewall coupling structure is attached to the sidewall assembly. The sidewall coupling structure is friction-fit coupled to the floor coupling structure to couple together the floor coupling structure and the sidewall assembly.

Certain embodiments provide a method of assembling a vehicle cabin. The method includes attaching a floor coupling structure to a floor panel of an internal cabin of a vehicle, and friction-fit attaching a sidewall coupling structure to the floor coupling structure.

DETAILED DESCRIPTION OF THE DISCLOSURE

Figure 1:
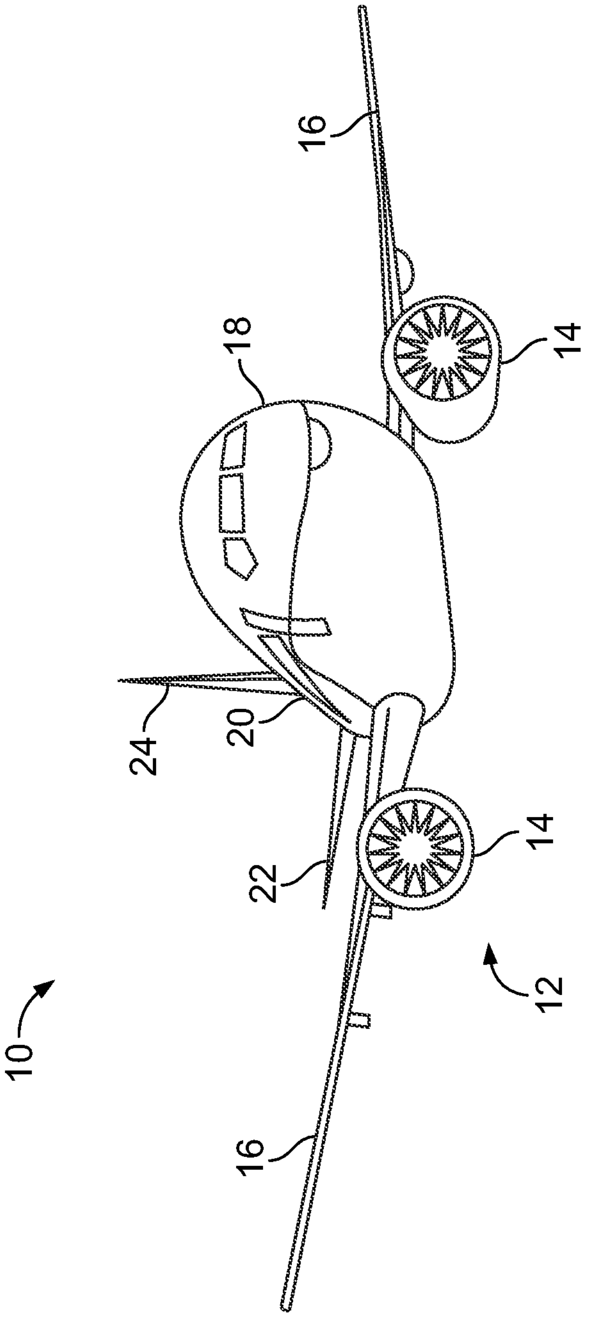
FIG. 1 illustrates a perspective front view of an aircraft which may include a cabin sidewall floor coupling assembly according to the embodiments described herein.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain embodiments of the present disclosure provide a sidewall floor coupling assembly that couples a floor assembly to a sidewall assembly within an internal cabin of a vehicle. The sidewall floor coupling assembly, also referred to herein as floor-to-sidewall assembly and simply as assembly, includes a floor coupling structure and a sidewall coupling structure. The floor coupling structure is a connector member that is attached to the floor assembly. The sidewall coupling structure is attached to a sidewall assembly. The sidewall coupling structure is coupled to the floor coupling structure without fasteners. Optionally, neither hand tools nor machinery is needed to connect the sidewall coupling structure to the floor coupling structure. The sidewall coupling structure may couple to the flexible via a friction fit. For example, the sidewall coupling structure may snap onto the flexible attachment member. When coupled, the floor coupling structure and the sidewall coupling structure mechanically connect the floor assembly to the respective sidewall assembly. The sidewall floor coupling assembly presented herein may provide more efficient and less complex installation than known connector assemblies. For example, the tool-less and fastener-less coupling between the sidewall coupling structure to the floor coupling structure may improve reduce assembly time and effort, without sacrificing performance or longevity. The sidewall floor coupling assembly may have less weight than known floor-to-sidewall connector assemblies, which may contribute to more energy-efficient vehicle travel.

In an embodiment, the sidewall coupling structure of the sidewall floor coupling assembly includes or represents an airbridge frame. The sidewall coupling structure may be mounted to a dado panel of a dado assembly (e.g., lower sidewall assembly). The dado assembly may include at least one air grill, the dado panel, a second airbridge, and/or a kick plate. The sidewall coupling structure may represent a component of the dado assembly. The dado panel may be secured to a sidewall panel of an upper sidewall assembly. The sidewall panel may be secured by brackets to structural elements of the vehicle, such as frame members of a fuselage. Optionally, the dado panel may be coupled to the sidewall panel at a slip joint, which enables the dado panel limited movement relative to the sidewall panel and the structural elements of the vehicle. The slip joint may enable the sidewall coupling structure mounted to dado panel to lower onto the floor coupling structure to establish the friction fit coupling configuration at the interface between the floor and the sidewall.

The floor coupling structure may have a floor mount portion secured to a floor assembly of the cabin. The floor coupling structure may also include a male interface portion that extends upwardly from the floor mount portion. The male interface portion may snap-fit with the sidewall coupling structure to secure the floor assembly to the sidewall assembly. The floor coupling structure may be a mop sill.

Optionally, the floor coupling structure may be designed to flex to minimize the loads between the floor assembly and the sidewall assembly in the cabin. Relative to known connectors between the floor and the sidewall, the floor coupling structure described herein may withstand flex cycling more resiliently with less degradation and damage experienced. As a result, the sidewall floor coupling assembly may have a longer installed operational life, and require less maintenance, than known connector systems.

FIG. 1 illustrates a perspective front view of an aircraft 10 which may include a cabin floor-to-sidewall assembly according to the embodiments described herein. The aircraft 10 includes a propulsion system 12 that includes engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which includes a flight deck or cockpit, one or more work sections (for example, galleys, personnel carry-on baggage areas, and the like), one or more passenger sections (for example, first class, business class, and coach sections), one or more lavatories, and/or the like. The floor-to-sidewall assembly, and a plurality of such assemblies, disclosed herein may be located within the internal cabin of the aircraft.

Alternatively, instead of an aircraft, embodiments of the cabin floor-to-sidewall assembly may be used with various other types of vehicles. Suitable vehicles may include automobiles, buses, trucks, locomotives and train cars, watercraft, spacecraft, and the like.

Figure 2A:
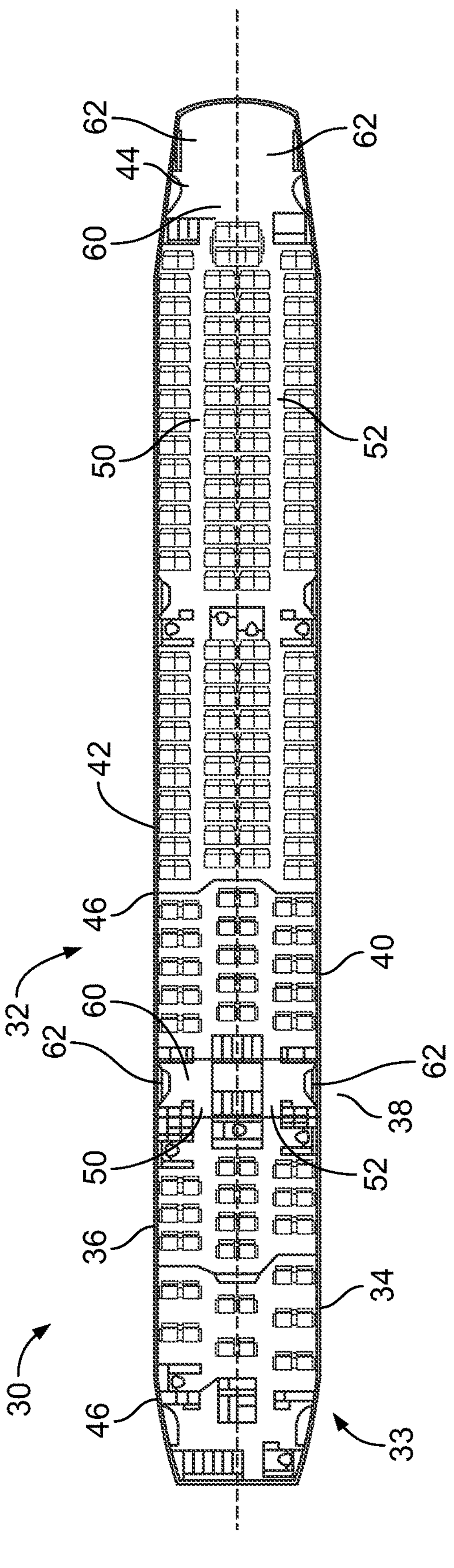
FIG. 2A illustrates a top plan view of a first internal cabin of an aircraft.

FIG. 2A illustrates a top plan view of a first internal cabin 30 of an aircraft. The internal cabin 30 is within a fuselage 32 of the aircraft. The fuselage 32 may be the fuselage 18 of the aircraft 10 in FIG. 1. One or more fuselage walls may define the internal cabin 30. The internal cabin 30 includes multiple sections, including a front section 33, a first class section 34, a business class section 36, a front galley station 38, an expanded economy or coach section 40, a standard economy of coach section 42, and an aft section 44, which may include multiple lavatories and galley stations. The internal cabin 30 may include more or less sections than shown. For example, the internal cabin 30 may not include a first class section, and may include more or less galley stations than shown. At least some of the sections may be separated by a cabin transition area 46, which may include class divider assemblies.

As shown in FIG. 2A, the internal cabin 30 includes two aisles 50 and 52 that lead to the aft section 44. The aisles 50, 52 may extend to egress paths or door passageways 60. Exit doors 62 are located at ends of the egress paths 60. Optionally, the internal cabin 30 may have more or less aisles than shown in the illustrated embodiment. For example, the internal cabin 30 may include a single aisle that extends through the center of the internal cabin 30 and leads to the aft section 44. The internal cabin 30 may include more or less egress paths 60 and/or different locations of egress paths 60 in an alternative embodiment.

The vehicle cabin floor-to-sidewall assembly, and/or a plurality of such assemblies, according to the embodiments disclosed herein may be installed within the internal cabin 30.

Figure 2B:
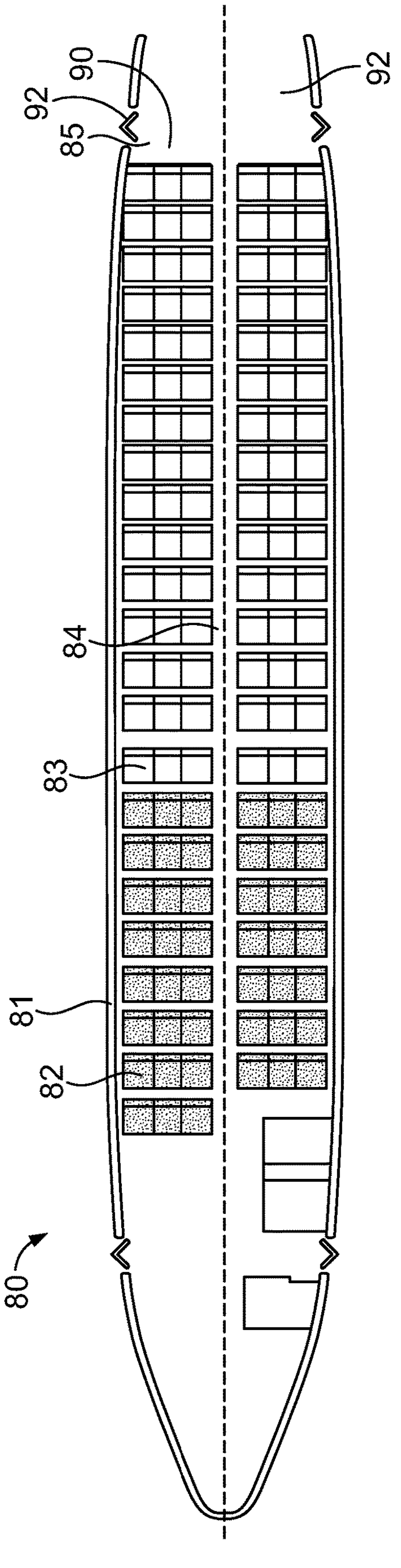
FIG. 2B illustrates a top plan view of a second internal cabin of an aircraft.

FIG. 2B illustrates a top plan view of a second internal cabin 80 of an aircraft. The internal cabin 80 is within a fuselage 81 of the aircraft. The fuselage 80 may be the fuselage 18 of the aircraft 10 in FIG. 1. One or more fuselage walls may define the internal cabin 80. The internal cabin 80 includes multiple sections, including a main cabin 82 having passenger seats 83, and an aft section 85 behind the main cabin 82 (relative to a front end of the aircraft). The internal cabin 80 may include more or less sections than shown.

The internal cabin 80 may include a single aisle 84 that leads to the aft section 85. The aisle 84 may extend through the center of the internal cabin 80. For example, the aisle 84 may be coaxially aligned with a center (e.g., medial) longitudinal plane of the internal cabin 80, halfway between the two sides of the internal cabin 80. The aisle 84 extends to an egress path or door passageway 90. Exit doors 92 are located at ends of the egress path 90. The vehicle cabin floor-to-sidewall assembly, and/or a plurality of such assemblies, according to the embodiments disclosed herein may be installed within the internal cabin 80.

Figure 3:
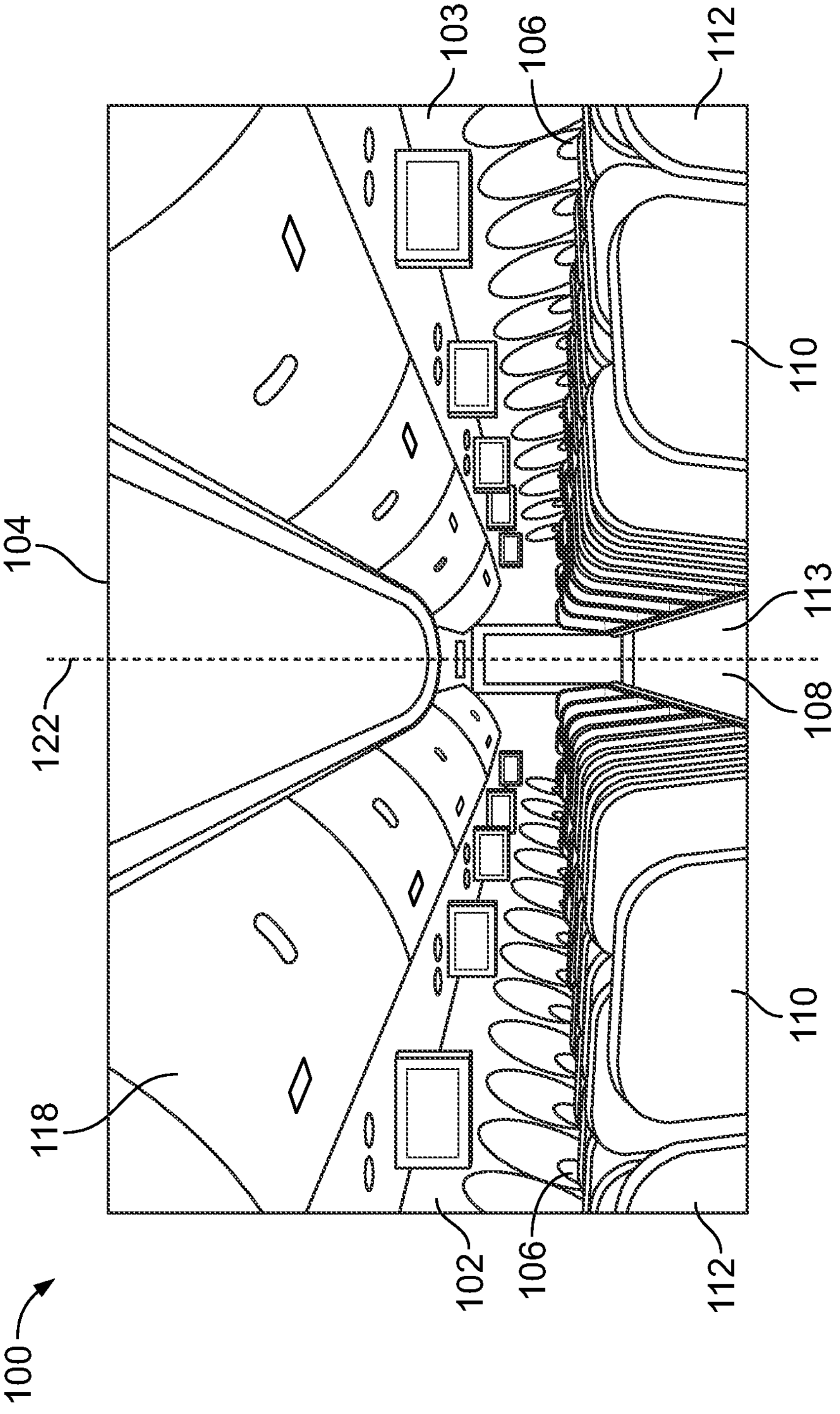
FIG. 3 illustrates a perspective interior view of an internal cabin of an aircraft, according to an embodiment of the present disclosure.

FIG. 3 illustrates a perspective interior view of an internal cabin 100 of an aircraft, according to an embodiment of the present disclosure. The internal cabin 100 may be within the aircraft 10 shown in FIG. 1. The internal cabin 100 may be the internal cabin 80 shown in FIG. 2B. The internal cabin 100 includes a floor assembly 108 that extends from a first side 102 of the cabin 100 to a second side 103 of the cabin 100. The first and second sides 102, 103 are defined at least in part by sidewall assemblies that connect to a ceiling 104 of the cabin 80. The internal cabin 100 includes windows 106 along the first and second sides 102, 103. The floor assembly 108 supports rows 112 of seats 110. In the illustrated embodiment, each row 112 includes groups of three seats 110 on either side of a single aisle 113. The rows 112 are spaced apart along a longitudinal length of the cabin 80. In alternative configurations, at least some rows may include groups of more or less than three seats and/or at least two aisles.

As used herein, the term "outboard" means a position that is farther away from a center (e.g., medial) longitudinal plane 122 of the internal cabin 100, relative to another component. The center longitudinal plane 122 is halfway between the first and second sides 102, 103. The term "inboard" means a position that is closer to the center longitudinal plane 122 relative to another component.

Figure 4:
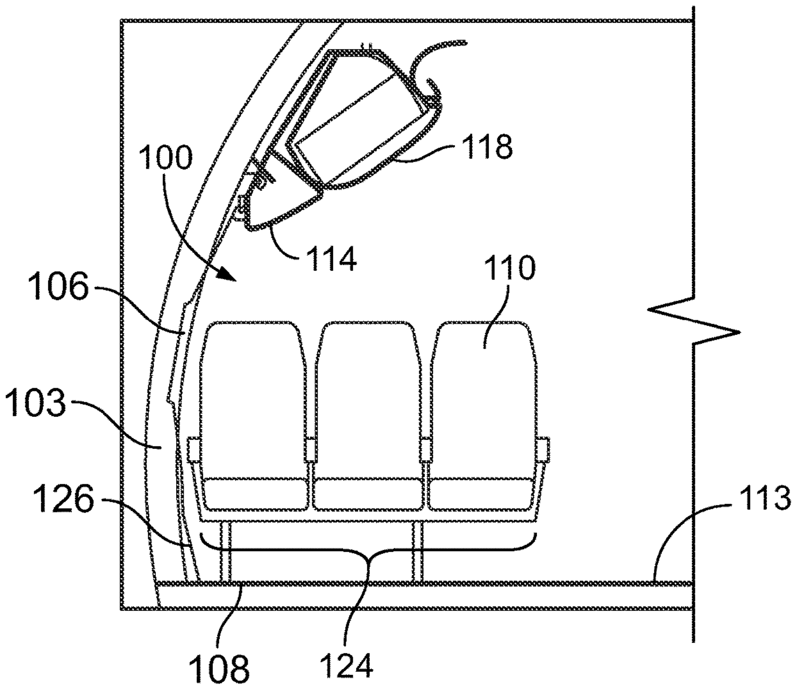
FIG. 4 is a cross-sectional view of a portion of the internal cabin shown in FIG. 3.

FIG. 4 is a cross-sectional view of a portion of the internal cabin 100 shown in FIG. 3. The illustrated portion includes a group 124 of three passenger seats 110 disposed beneath a PSU 114 and an overhead stowage bin assembly 118. The illustrated seats 110 are disposed between the aisle 113 and the second side 103 of the cabin 100. The cabin 100 includes a sidewall assembly 126 along the second side 103. The sidewall assembly 126 holds the window 106. The sidewall assembly 126 includes one or more sidewall panels, insulation and/or noise attenuating panels, air grills, airbridges, kick plates, and/or the like, as described herein. The sidewall assembly 126 is indirectly mechanically connected to the floor assembly 108 via sidewall floor coupling assemblies according to embodiments described herein.

Although FIG. 4 only shows the second side 103 of the cabin 100, the first side 102 may mirror the second side 103. For example, the cabin 100 includes another sidewall assembly along the first side 102, which is indirectly mechanically connected to the floor assembly 108 via a second set of sidewall floor coupling assemblies according to the embodiments described herein. Along each of the two sides 102, 103, the internal cabin 100 may include multiple sidewall assemblies 126 arranged end to end extending a length of the cabin 100 (e.g., parallel to the aisle 113). The internal cabin 100 may also have multiple sidewall floor coupling assemblies and/or multiple floor panels along the length of the cabin. For example, a first sidewall floor coupling assembly on the first side 102 may connect a first sidewall assembly 126 to a first floor panel along the floor assembly 108, and a second sidewall floor coupling assembly on the first side 102 may connect a second sidewall assembly 126 to a second floor panel along the floor assembly 108.

Figure 5A:
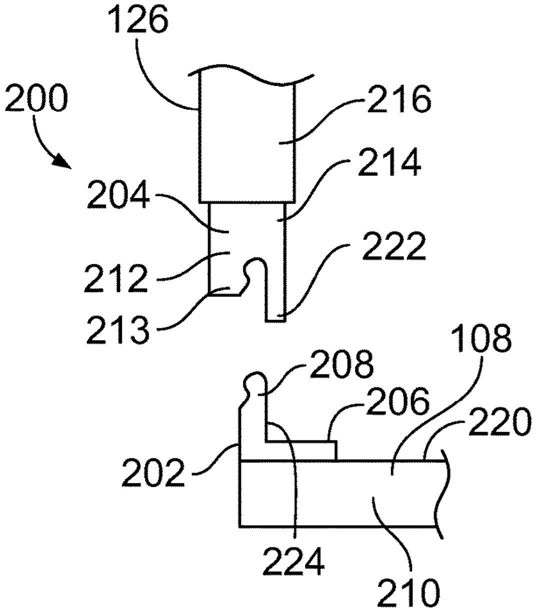
FIG. 5A illustrates a sidewall floor coupling assembly for use in a vehicle cabin according to an embodiment, where the sidewall floor coupling assembly is shown in an uncoupled or unassembled state.

FIG. 5A illustrates a sidewall floor coupling assembly 200 for use in a vehicle cabin according to an embodiment, where the sidewall floor coupling assembly 200 is shown in an uncoupled or unassembled state. The sidewall floor coupling assembly 200 (also referred to herein as assembly and floor-to-sidewall assembly) may be installed within the internal cabin 100 shown in FIGS. 3 and 4. The assembly 200 includes a floor coupling structure 202 and a sidewall coupling structure 204. The floor coupling structure 202 may be a component of the floor assembly 108. The floor coupling structure 202 defines a first and/or lower coupling structure of the assembly 200. The floor coupling structure 202 includes a floor interface portion 206 and a sidewall interface portion 208. The floor interface portion 206 is attached to the floor assembly 108. For example, the floor assembly 108 may include multiple floor panels 210 arranged in at least one row and/or column within the internal cabin. The floor interface portion 206 may be attached to one or more of the floor panels 208 of the floor assembly 108.

The sidewall coupling structure 204 defines a second and/or upper coupling structure of the assembly 200. The sidewall coupling structure 204 may be a component of the sidewall assembly 126 shown in FIG. 4. The sidewall coupling structure 204 has at least one friction-fit portion 212 and a sidewall attachment section 214. The sidewall attachment section 214 couples the sidewall coupling structure 204 to the sidewall assembly 126 of the internal cabin 100. The sidewall attachment section 214 in the illustrated embodiment is directly mounted to a structural component 216 of the sidewall assembly 126. For example, the structural component 216 may include or represent an airbridge, a dado panel, an air grill, and/or the like. Note that, in some embodiments, the sidewall coupling structure 204 and the structural component 216 can be comprised of a single component or unitary body, or be comprised of three or more components in a suitable assembly.

The friction-fit portion 212 of the sidewall coupling structure 204 removably couples to the sidewall interface portion 208 of the floor coupling structure 202 at a coupling interface. In at least one embodiment, the coupling interface may be a friction-fit interface (e.g., a friction fit coupling interface). The friction-fit interface may enable the sidewall coupling structure 204 to couple to the floor coupling structure 202 without the use of hand tools or machinery, and without fasteners (e.g., bolts, screw rivets, or the like) that are discrete and separate from the sidewall floor coupling assembly 200. The friction-fit interface may be a snap-fit interface that provides a tactile and/or auditory indication when the snap-fit interface is established. In at least one embodiment, the friction-fit portion 212 includes a deflectable arm 213 that defines a portion of the snap-fit interface as the deflectable arm 213 snaps into place around the sidewall interface portion 208.

Figure 5B:
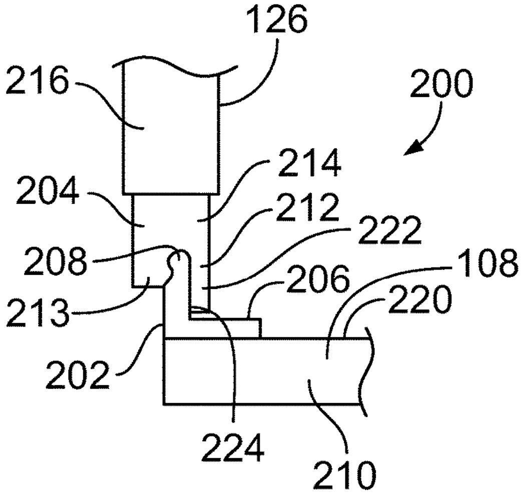
FIG. 5B illustrates the sidewall floor coupling assembly of FIG. 5A in a coupled or assembled state relative to the state shown in FIG. 5A.

FIG. 5B illustrates the floor-to-sidewall assembly 200 of FIG. 5A in a coupled or assembled state relative to the state shown in FIG. 5A. The coupling of the sidewall coupling structure 204 to the floor coupling structure 202 mechanically connects the sidewall structure 216 to the floor panel 210. In the assembled state, the sidewall coupling structure 204 is located closer to a top surface 220 of the floor panel 210 than in the unassembled state shown in FIG. 5A. For example, the sidewall coupling structure 204 and attached structural component 216 of the sidewall assembly 126 may move relative to the floor coupling structure 202 and the floor panel 210 during the coupling operation. In the illustrated orientation, the sidewall coupling structure 204 and structural component 216 are lowered from above onto the sidewall interface portion 208 of the floor coupling structure 202.

Optionally, the floor coupling structure 202 may minimize or reduce loads transferred between the floor assembly 108 and the sidewall assembly 126 when operating the vehicle, relative to known floor-to-sidewall coupling elements and assemblies. For example, forces exerted on the fuselage of the aircraft during a flight may cause the sidewall assembly 126 to move, flex, or bend relative to the floor assembly 108, and vice versa. The forces (or loads) may include torsional and/or twisting forces, tensive forces, compressive forces, and/or the like. The floor coupling structure 202 may absorb, accommodate, distribute, and/or otherwise withstand the forces transferred between the floor assembly 108 and the sidewall assembly 126. In response to receiving a load, the floor coupling structure 202 may deflect by bending or flexing, without uncoupling from the sidewall coupling structure 204 or detaching from the floor panel 210. The floor coupling structure 202 may deflect to reduce or minimize load transfer (e.g., force transfer) between the sidewall and the floor. The floor coupling structure 202 may be designed to withstand repeated flex cycling with greater resiliency, and with reduced load transfer between the floor and the sidewall, than known floor-to-sidewall connector members.

The sidewall floor coupling assembly 200 may distribute forces relatively evenly along a length of the sidewall floor coupling assembly 200. For example, the friction-fit portion 212 of the sidewall coupling structure 204 may include a flange 222 or lip that extends along and engages an inboard surface 224 of the sidewall interface portion 208 to define an elongated contact interface that is shown in more detail in the isometric views herein. The elongated contact interface enables the sidewall coupling structure 204 and the floor coupling structure 202 to evenly distribute loads along a length of the internal cabin. The elongated contact interface may also help structurally secure the sidewall coupling structure 204 to the floor coupling structure 202, which limits or reduces the risk of damage and uncoupling due to impacts (e.g., kicks, dropped luggage, etc.), torsional or twisting forces between the floor and sidewall, and the like.

Figure 6:
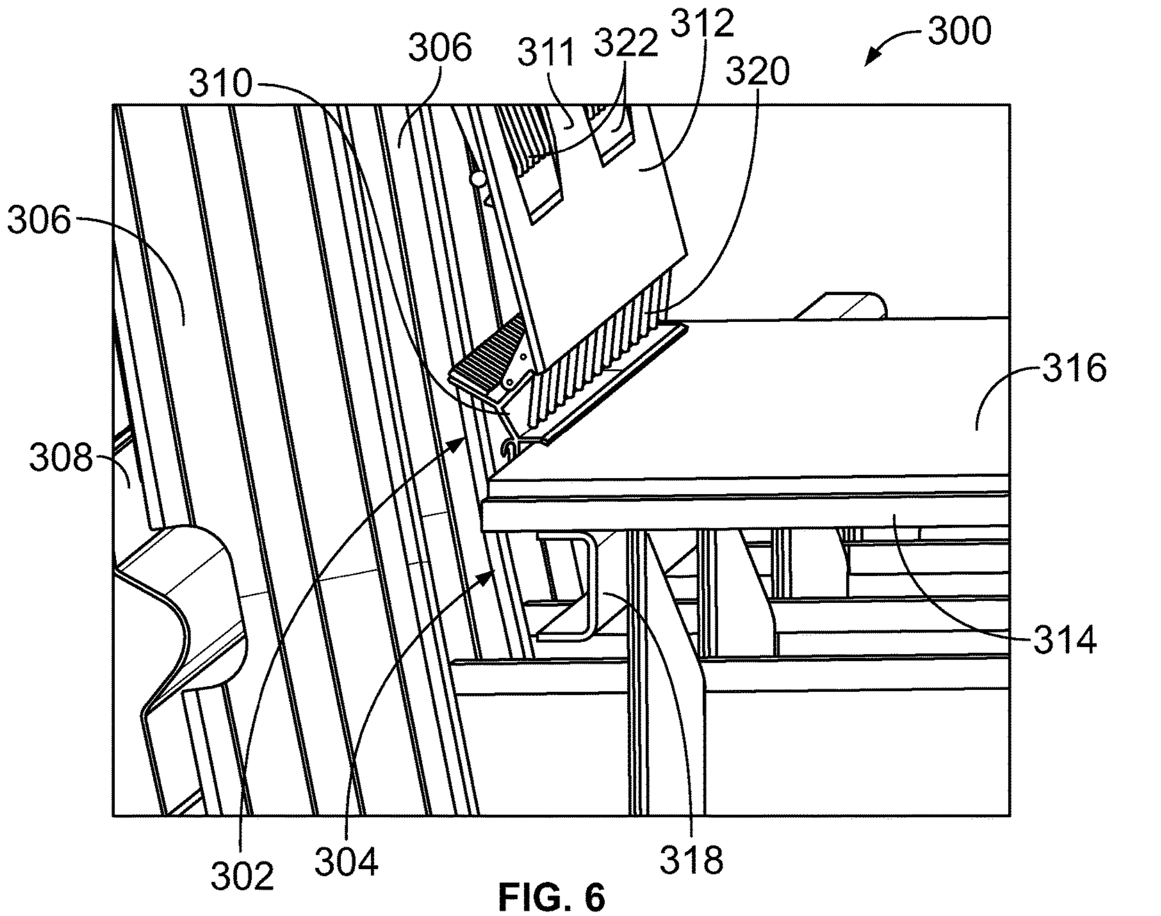
FIG. 6 is an isometric view of a portion of an internal cabin of a vehicle including a sidewall floor coupling assembly according to an embodiment.

FIG. 6 is an isometric view of an assembled portion of an internal cabin 300 of a vehicle, including a sidewall floor coupling assembly 302, according to an embodiment. The portion of the internal cabin 300 shows a floor assembly 304, structural elements 306 along a side 308 of the cabin 300, and the sidewall floor coupling assembly 302. The structural elements 306 may be frame members of a fuselage, such as stringers. The floor assembly 304 may include a floor panel 314, a floor covering 316, and a floor support structure 318. The floor panel 314 is mounted on the floor support structure 318. The floor covering 316 is disposed on the floor panel 314, such that the floor panel 314 is between the floor covering 316 and the floor support structure 318. The floor covering 316 may include one or more of a mat, a pad, a carpet, a rug, or the like. The internal cabin 300 may be any of the cabins 30, 80, 100 described in FIGS. 1 through 4. The sidewall floor coupling assembly 302 (referred to herein as assembly 302) may be that same or similar to the assembly 200 shown in FIGS. 5A and 5B, but incorporated with the airplane components shown in FIG. 6.

The assembly 302 includes a sidewall coupling structure 310. The sidewall coupling structure 310 is coupled to a lower sidewall, or dado, assembly 312 of the internal cabin 300. In the illustrated embodiment, the sidewall coupling structure 310 includes or represents an airbridge frame 320 having openings that define respective slots to facilitate passage of return air during operation of the vehicle. The dado assembly 312 includes a dado panel 311 that defines openings to accommodate air grills 322. The air grills 322 have openings to facilitate passage of air, such as during a decompression event. The sidewall coupling structure 310 of the assembly 302 is indirectly mechanically attached to the floor assembly 304 via the floor coupling structure 324 (shown in FIG. 7) of the assembly 302.

Figure 7:
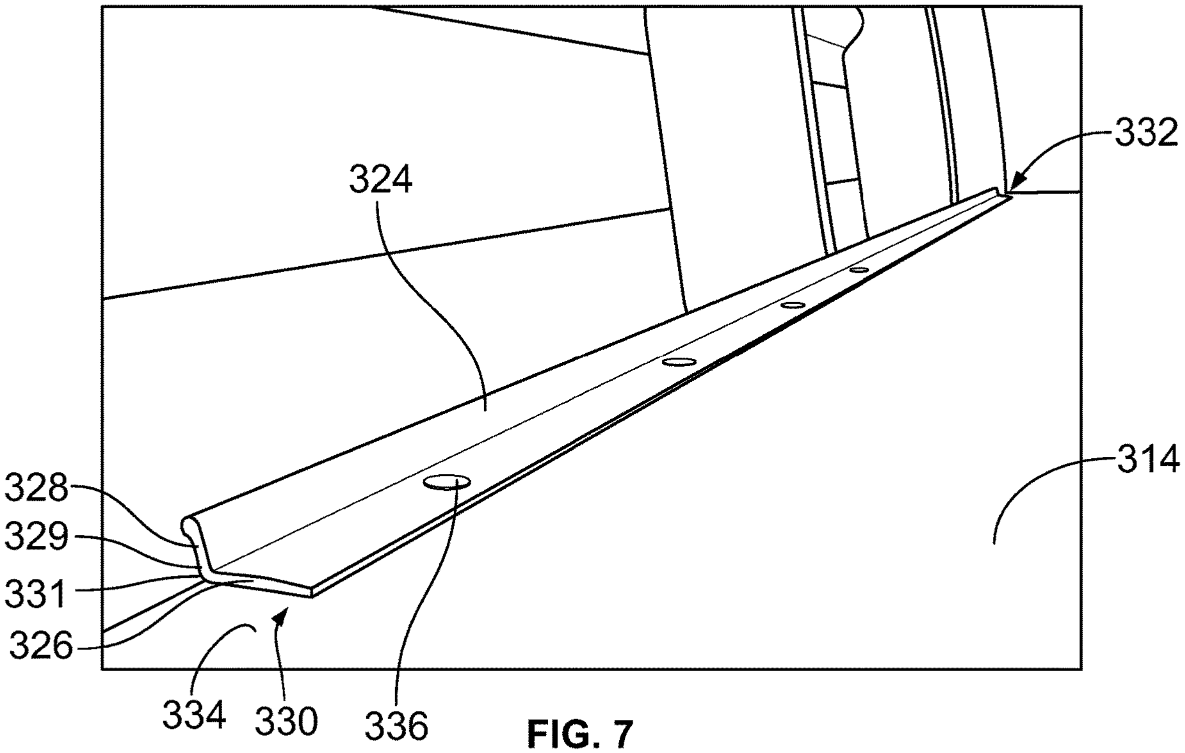
FIG. 7 is an isometric view of a floor coupling structure of the sidewall floor coupling assembly attached to a floor panel according to the embodiment of FIG. 6.

FIGS. 7 through 12 illustrate a process for installing the sidewall floor coupling assembly 302 in an internal cabin of a vehicle according to an embodiment. FIG. 7 is an isometric view of the floor coupling structure 324 of the assembly 302 attached to the floor panel 314 according to an embodiment (and in a position prior to installing the floor covering 316 and attaching the sidewall coupling structure 302). The floor coupling structure 324 has a floor interface portion 326 and a sidewall interface portion 328. The sidewall interface portion 328 extends transversely relative to the floor interface portion 326. The floor coupling structure 324 is elongated to extend a length from a first end 330 to a second end 332 that is opposite the first end 332. In an embodiment, multiple floor coupling structures 324 may be colinearly arranged end to end to extend a full length of a section of the internal cabin (e.g., the coach section).

The floor coupling structure 324 may comprise a unitary, monolithic body 329. The body 329 may be generally L-shaped and defined by the sidewall interface portion 328 and the floor interface portion 326, such that the sidewall interface portion 328 projects vertically or upwardly from the floor interface portion 326. A transition portion 331 may be defined between the floor interface portion 326 and the sidewall interface portion 328. The transition portion 331 defines an "elbow-shaped" portion that connects together the floor interface portion 326 and the sidewall interface portion 328. In the illustrated embodiment, the transition portion 331 transitions from the flat floor interface portion 326 to the upwardly-projecting sidewall interface portion 328. Optionally, the transition portion 331 may experience bending or flexing during use of the vehicle to reduce or minimize loads. As used herein, the term "flexing" means an attribute of a material object to deform generally elastically upon receiving an applied stress and generally returning to its original shape and/or position when the applied stress is removed.

The sidewall interface portion 328 may project at an angle that is between 45 degrees and 135 degrees relative to a planar surface of (or a plane defined by) the floor interface portion 326, and relative to the floor panel 314, such as between 60 degrees and 120 degrees in one example. For example, the sidewall interface portion 328 may extend slightly greater than 90 degrees relative to the floor interface portion 326. The body 329 may be a relatively thin strip of flexible material. For instance, the material of the body 329 may be comprised of a flexible material such as a plastic, a composite, a metal, or the like, or a combination thereof. In an example, the body 329 is comprised of a plastic material molded to define the general or substantial L-shape cross sectional area.

The floor coupling structure 324 is oriented such that the sidewall interface portion 328 is outboard of the floor interface portion 326, which attaches to the floor panel 314. In the illustrated embodiment, the floor interface portion 326 extends along and physically contacts a floor covering support surface 334 of the floor panel 314. The floor covering support surface 334 may be the upper surface of the floor panel 314, and is referred to herein as upper surface 334. The floor interface portion 326 may be attached to the floor panel 314 via fasteners, adhesive, and/or the like. In the illustrated embodiment, fasteners 336 are installed that penetrate through a thickness of the floor interface portion 326 (e.g., via through holes) and then into the floor panel 314 to secure the floor coupling structure 324 to the floor panel 314. The fasteners 336 may be screws, screw rivets (e.g., scrivets), another type of rivet, bolts, nails, or the like. The fasteners 336 are spaced apart along a length of the floor coupling structure 324. When mounted, a lower surface of the floor interface portion 326 may be overlaid on and planar with the upper surface 334 of the floor panel 314, and the sidewall interface portion 328 projects at least partially upward (e.g., towards the ceiling) from the floor panel 314.

Figure 8:
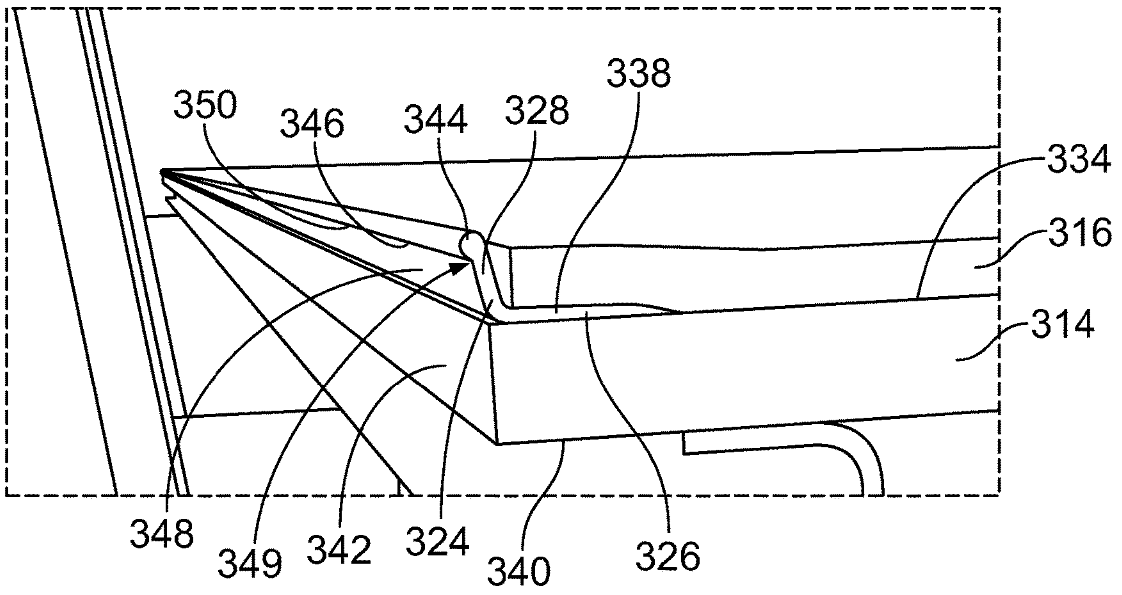
FIG. 8 is an isometric view showing a floor covering applied on the floor panel according to the embodiment of FIG. 6.

FIG. 8 is an isometric view showing the floor covering 316 covering the floor panel 314 according to an embodiment. The floor covering 316 is disposed on the upper surface 334 of the floor panel 314. In an embodiment, the floor covering 316 is installed onto the floor panel 314 after the floor coupling structure 324 is mounted to the floor panel 314, although this order could be reversed in some instances. A portion of the floor covering 316 may overlap and extend along an upper surface 338 of the floor interface portion 326 of the floor coupling structure 324. In an alternative embodiment, the floor interface portion 326 of the floor coupling structure 324 may be attached along a bottom or underneath surface 340 of the floor panel 314 that is opposite the upper surface 334, instead of along the upper surface 334. In yet another embodiment, the floor interface portion 326 may be attached to an outboard edge 342 of the floor panel 314, which extends from the upper surface 334 to the bottom surface 340.

In the illustrated embodiment, the sidewall interface portion 328 of the floor coupling structure 324 extends from the transition portion 331 to a distal end 344 of the sidewall interface portion 328. The distal end 344 may be elongated to extend a full length of the floor coupling structure 324. In an embodiment, the floor coupling structure 324 is oriented such that the distal end 344 of the sidewall interface portion 328 defines a line that is approximately parallel to a line or plane defined by the outboard edge 342 of the floor panel 314. In an embodiment, all, or a majority, of the floor coupling structure 324 is disposed inboard of the outboard edge 342 of the floor panel 314. For example, optionally only the distal end 344 of the sidewall interface portion 328 projects outboard beyond the edge 342 of the floor panel 314. As a result, forces exerted from the sidewall coupling structure 310 onto the floor coupling structure 324, when coupled, are transferred to the floor panel 314 beneath the floor coupling structure 324. This configuration may reduce damage and flexing of the floor coupling structure 324 relative to a configuration in which a greater percentage of the floor coupling structure 324 projects beyond the outboard edge 342 of the floor panel 314.

The sidewall interface portion 328 of the floor coupling structure 324 may include a catch surface 346 extending along an outboard side 348 of the sidewall interface portion 328. The catch surface 346 may be a surface along, or defined by, a longitudinal recess or channel 349. The recess 349 may be defined at least in part by a ridge 350 that is elongated along a length of the sidewall interface portion 328. The ridge 350 optionally may extend the full length of the floor coupling structure 324.

Figure 9:
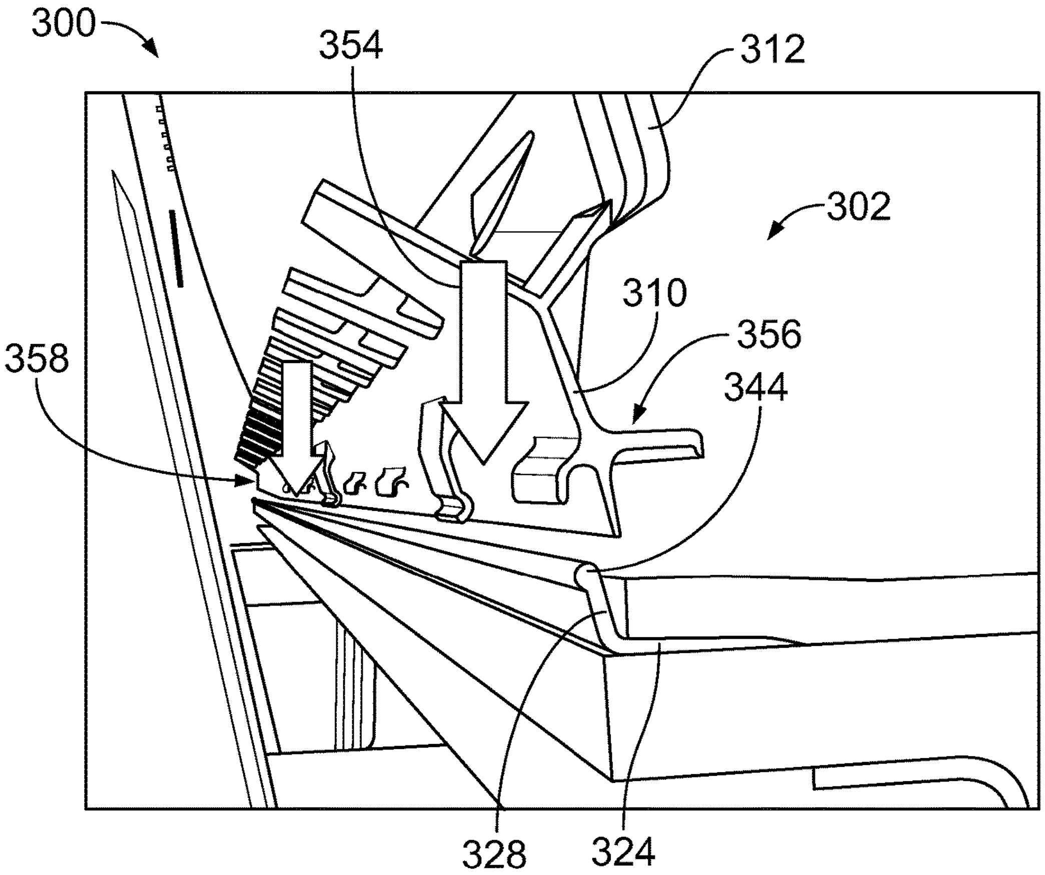
FIG. 9 is an isometric view of the vehicle cabin showing a sidewall coupling structure of the sidewall floor coupling assembly poised for coupling to the floor coupling structure according to the embodiment of FIG. 6.

FIG. 9 is an isometric view of the vehicle cabin 300 showing the sidewall coupling structure 310 of the assembly 302 poised for coupling to the floor coupling structure 324 according to an embodiment. The sidewall coupling structure 310 is longitudinally elongated from a first end 356 thereof to a second end 358 thereof, which is opposite the first end 356. The sidewall coupling structure 310 is moved towards the sidewall interface portion 328 of the floor coupling structure 324 during a coupling operation. For example, the sidewall coupling structure 310 may be lowered towards the distal end 344 of the sidewall interface portion 328 from above. The sidewall coupling structure 310 may be secured to the dado assembly 312 of the sidewall when this coupling operation takes place. As such, the dado assembly 312 may move with the connected sidewall coupling structure 310 in a mating direction 354 towards the floor coupling structure 324. The mating direction 354 may be straight or generally downward, as shown by the illustrative arrows.

Figure 10:
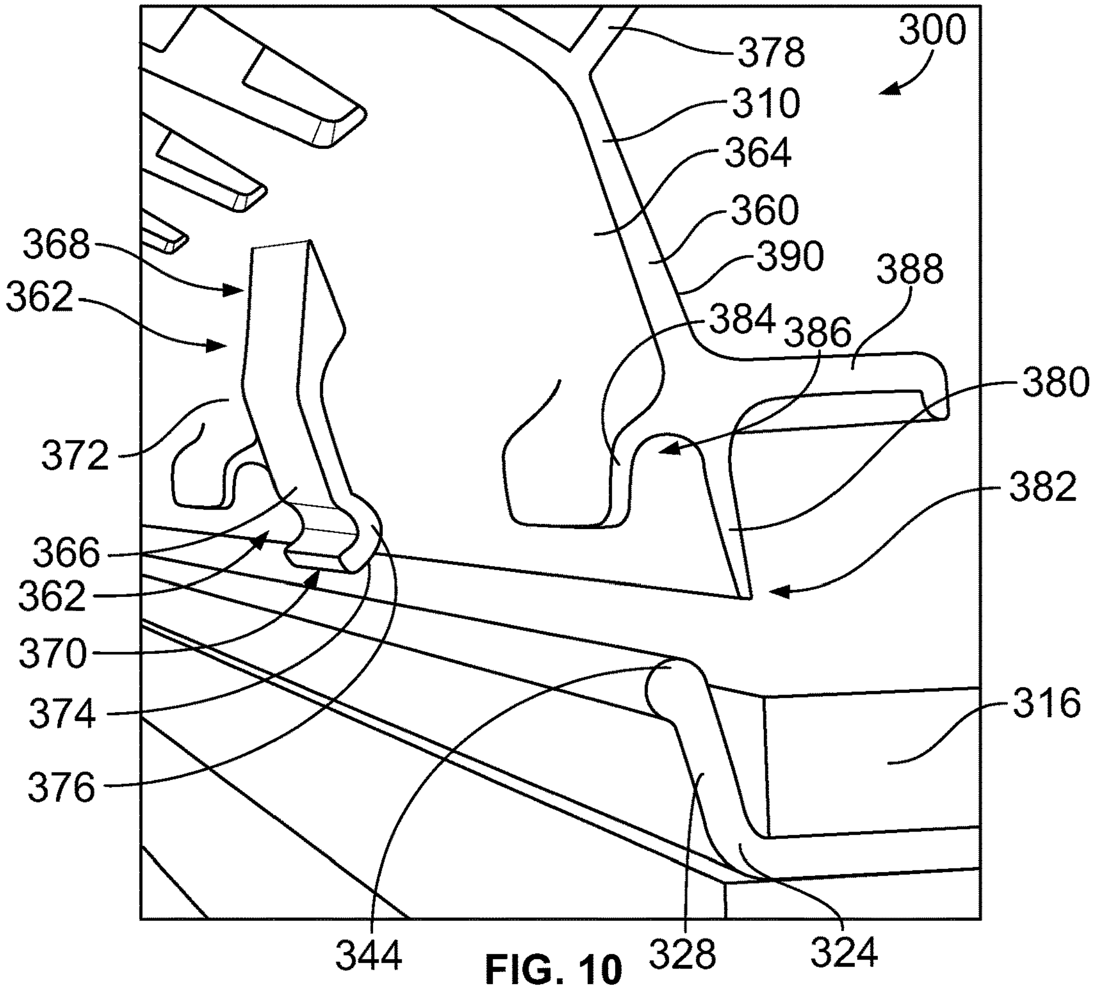
FIG. 10 is a close-up of a portion of the internal cabin shown in FIG. 9.

FIG. 10 is a close-up of a portion of the internal cabin 300 shown in FIG. 9. The sidewall coupling structure 310 includes a base portion 360 and at least one friction fit portion 362 along the base portion 360. The friction fit portion 362 is configured to couple to the sidewall interface portion 328 of the floor coupling structure 324 via a friction fit coupling configuration. In the illustrated embodiment, the base portion 360 includes a planar wall 364. The friction fit portion 362 includes a deflectable arm 366 (e.g., a clip body). The deflectable arm 366 extends from an outboard surface 372 of the base portion 360. A fixed end 368 of the arm 366 is attached to the base portion 360. The deflectable arm 366 extends from the fixed end 368 to a free end 370 of the arm 366. The free end 370 may contact the outboard surface 372 when in a resting, non-coupled state. The arm 366 may define an S-curve profile along a distal tip. The S-curve profile includes a lead-in segment 374 at the free end 370 and a gripping segment 376. The deflectable arm 366 is oriented with the fixed end 368 located between the free end 370 and a sidewall attachment section 378 of the sidewall coupling structure 310. In the illustrated embodiment, the fixed end 368 is above the free end 370 as the sidewall coupling structure 310 is poised for coupling to the floor coupling structure 324. Note that the sidewall coupling structure 310 may include only one friction fit portion (e.g., having a profile like arm 366) extending along some or all of the length of the sidewall coupling structure 310, or it may include a plurality of friction fit portions (e.g., a plurality of arms 366).

The sidewall coupling structure 310 may include a flange 380 at an end 382 (e.g., a lower end) of the base portion 360 opposite the sidewall attachment section 378. The flange 380 may be a rib, a lip, or a fin. The flange 380 may be a single flange that continuously extends a length of the sidewall coupling structure 310 or a plurality of flanges spaced apart along the length of the sidewall coupling structure 310. The flange 380 optionally has a tapered thickness that thins with increasing proximity to the end 382. The flange 380 is a structural element that supports interlocking of the sidewall coupling structure 310 to the sidewall interface portion 328 of the floor coupling structure 324 to somewhat "sandwich" the sidewall interface portion 310 of the floor coupling structure 324 in a friction fit coupling configuration, as shown in FIGS. 11A and 11B.

The sidewall coupling structure 310 may also include at least one alignment feature 384 for aligning and guiding the coupling of the sidewall coupling structure 310 and the floor coupling structure 324. The alignment feature 384 defines a radial channel 386 sized and shaped to accommodate the distal end 344 of the sidewall interface portion 328. The alignment feature 384 may engage the distal end 344 to provide another friction-fit interface between the sidewall coupling structure 310 and the floor coupling structure 324 (in addition to the deflectable arm 366). In the illustrated embodiment, the alignment feature 384 is a curved lip or hook that projects from the outboard surface 372 of the base portion 360.

In an embodiment, the sidewall coupling structure 310 also includes a ledge 388 that covers an edge portion of the floor covering 316 when coupled to the floor coupling structure 324. The ledge 388 is cantilevered to project from an inboard surface 390 of the base portion 360. The ledge 388 may extend from the base portion 360 at a location that is generally opposite the at least one alignment feature 384. In an embodiment, the ledge 388, at least one alignment feature 384, flange 380, and at least one deflectable arm 366 may be integrally formed with the base portion 360. For example, the base portion 360 may be a plastic material that is molded to define the various features that extend from the base portion 360.

Figure 11A:
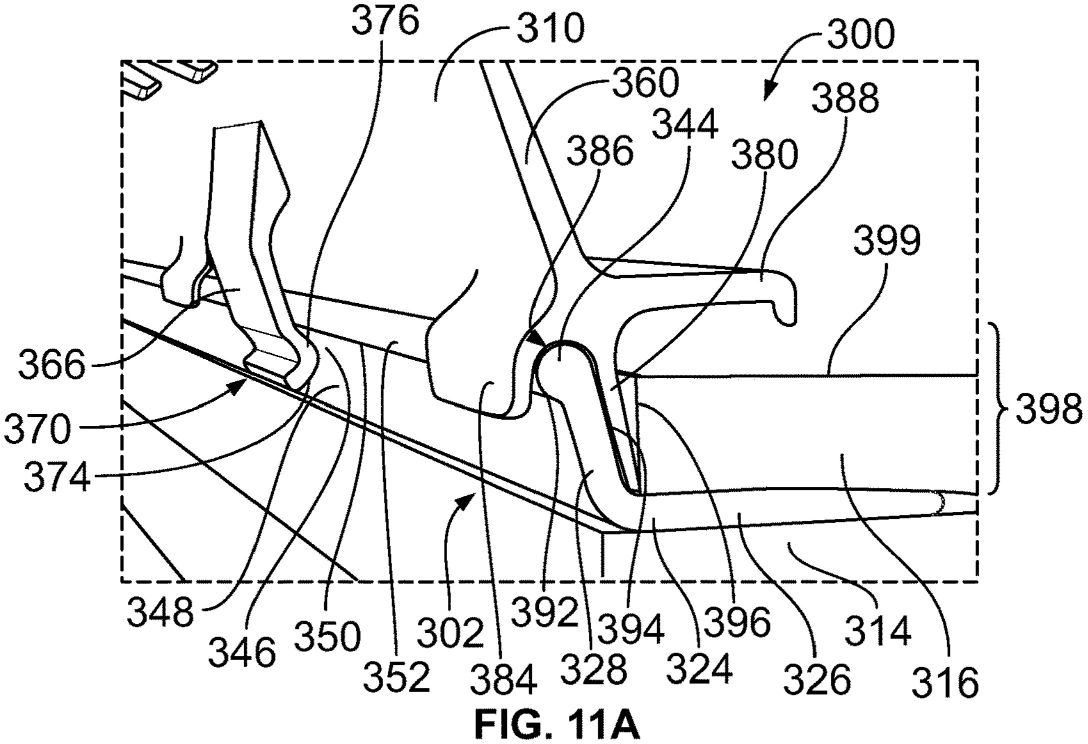
FIG. 11A is a close-up of the portion of the internal cabin shown in FIG. 10 with the sidewall floor coupling assembly in the coupled state such that the sidewall coupling structure is coupled to the floor coupling structure.
Figure 11B:
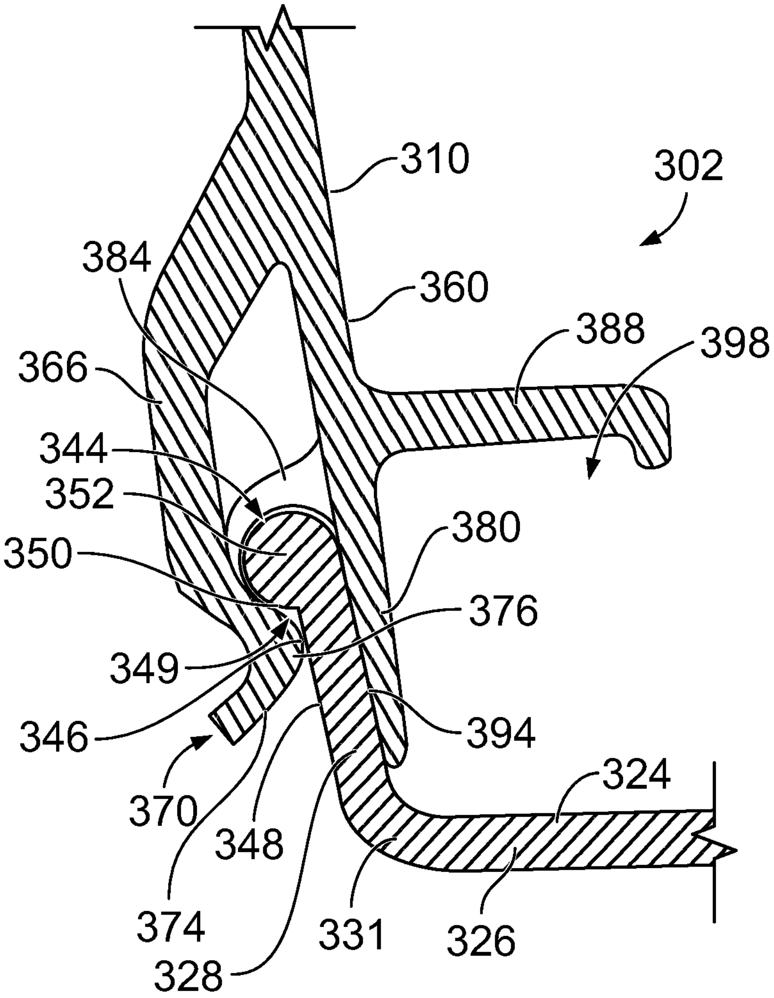
FIG. 11B is a side cross-sectional view isolating the sidewall coupling structure and floor coupling structure in the coupled state shown in FIG. 11A.

FIG. 11A is a close-up of the portion of the internal cabin 300 shown in FIG. 10 with the sidewall coupling structure 310 and the floor coupling structure 324 of the sidewall floor coupling assembly 302 in the coupled state. FIG. 11B is a side cross-sectional view isolating the sidewall coupling structure 310 and floor coupling structure 324 in the coupled state shown in FIG. 11A. The cross-section in FIG. 11B is taken along a line through one of the deflectable arms 366. With initial reference to FIG. 11B, the ridge 350 of the sidewall interface portion 328 of the floor coupling structure 324 may be an overhanging portion of a bead 352 at the distal end 344 of the sidewall interface portion 328. The bead 352 is wider and/or thicker than a portion of the sidewall interface portion 328 between the bead 352 and the transition portion 331. For example, the bead 352 may be a bulbous head at the distal end 344. The longitudinal recess 349 is defined at the interface between the ridge 350 and the outboard side 348 of the sidewall interface portion 328 below or adjacent to the ridge 350. The catch surface 346 may be located along the outboard side 348 within the recess 349.

With reference to both FIGS. 11A and 11B, as the sidewall coupling structure 310 is moved towards the sidewall interface portion 328 of the floor coupling structure 324 in the mating direction 354, the lead-in segment 374 of each deflectable arm 366 contacts the distal end 344 of the sidewall interface portion 328. The forces cause the free end 370 of the deflectable arm 366 to deflect in an outboard direction. Once the catch surface 346 along the outboard side 348 of the sidewall interface portion 328 passes the gripping segment 376 of the deflectable arm 366, the free end 370 of the deflectable arm 366 resiles towards the base portion 360. The gripping segment 376 engages the catch surface 346 via a friction fit coupling interface or configuration. In the illustrated embodiment, the deflectable arm 366 may snap as the gripping segment 376 transitions from contacting the ridge 350 to contacting the catch surface 346 in the recess 349. In the coupled state, the sidewall interface portion 328 of the floor coupling structure 324 is sandwiched between the deflectable arm 366 and the flange 380. The snap-fit coupling configuration between the arm 366 and the sidewall interface portion 328 opposes uncoupling of the sidewall coupling structure 310 and the floor coupling structure 324.

With reference primarily to FIG. 11A, the distal end 344 of the sidewall interface portion 328 is received within the channel 386 of each alignment feature 384. An inner surface 392 of the alignment feature 384, that defines the channel 386, abuts the distal end 344. For example, the channel 386 may be sized and shaped to receive and accommodate the bead 352. The channel 386 may be slightly larger than the bead 352. The alignment feature 384 may be a friction fit interface that provides some retention of the distal end 344, although the retention may be primarily provided by the deflectable arms 366. The channel 386 provides a seat or saddle for the distal end 344 of the sidewall interface portion 328 to assist with maintaining the sidewall coupling structure 310 in a fixed position relative to the floor coupling structure 324.

Notably, because of the interface of the curved surfaces of the alignment feature 384 and the distal end 344, and because of the manner in which the deflectable arm 366 is coupled to the sidewall interface portion 328, the sidewall coupling structure 310 is allowed to slightly rotate or bend relative to the flexible attachment support 324 during operation of the vehicle. Said another way, the sidewall coupling structure 310 can rotate or flex about an axis of rotation that extends through and along a length of the distal end 344 of the flexible attachment support 324. This particular configuration may help to reduce loads transferred from the floor panel to the sidewall assembly, and ultimately to the stringers to which the sidewall is attached, which reduces fatigue on the various components that may otherwise be prone to damage or failure.

As shown in FIGS. 11A and 11B, the flange 380 when in the coupled state overlaps the sidewall interface portion 328 and abuts against an inboard side 394 of the sidewall interface portion 328. The physical contact between the flange 380 and the sidewall interface portion 328 assists the alignment features 384 with interlocking the sidewall coupling structure 310 in a fixed position relative to the floor coupling structure 324. The flange 380 is arranged inboard of the sidewall interface portion 328 to withstand forces exerted on the assembly 302 from the cabin 300, such as kicks from passengers, bumps from luggage, and/or the like, without uncoupling or damaging the assembly 302. In an embodiment, there is no similar flange that extends along and engages the outboard side 348 of the sidewall interface portion 328. Only the curved structures of the alignment features 384 and the flexible structures of the deflectable arms 366 are located along the outboard side 348. These curved and flexible structures may be spaced apart along the length as shown in FIG. 11A. As a result, the alignment features 384 and the deflectable arms 366 may be designed to enable the assembly 302 to accommodate rotational or torsional forces with some amount of freedom without uncoupling the sidewall coupling structure 310 from the floor coupling structure 324 or exerting undue stress on the materials to cause fatigue. For example, if a force from the fuselage causes the sidewall coupling structure 310 to rotate or flex about an axis of rotation that extends through and along a length of the distal end 344 of the flexible attachment support 324, the alignment features 384 and the deflectable arms 366 would flex, rotate, and/or absorb some of the rotational forces to avoid exerting undue stress on the sidewall interface portion 328 of the flexible attachment support 324.

The ledge 388 covers a top 399 of the floor covering 316, which blocks a view of an edge 396 of the floor covering 316 to people in the internal cabin. This enables the floor covering 316 to have a rough edge without any aesthetic detriment. Optionally, the ledge 388 may engage the top 399 of the floor covering 316 to retain the edge 396 of the floor covering 316 within the space 398 between the ledge 388 and the floor interface portion 326 of the floor coupling structure 324 via a friction fit. Retaining the edge 396 in the space 398 may secure the floor covering 316 in place on the floor panel 314.

Figure 12:
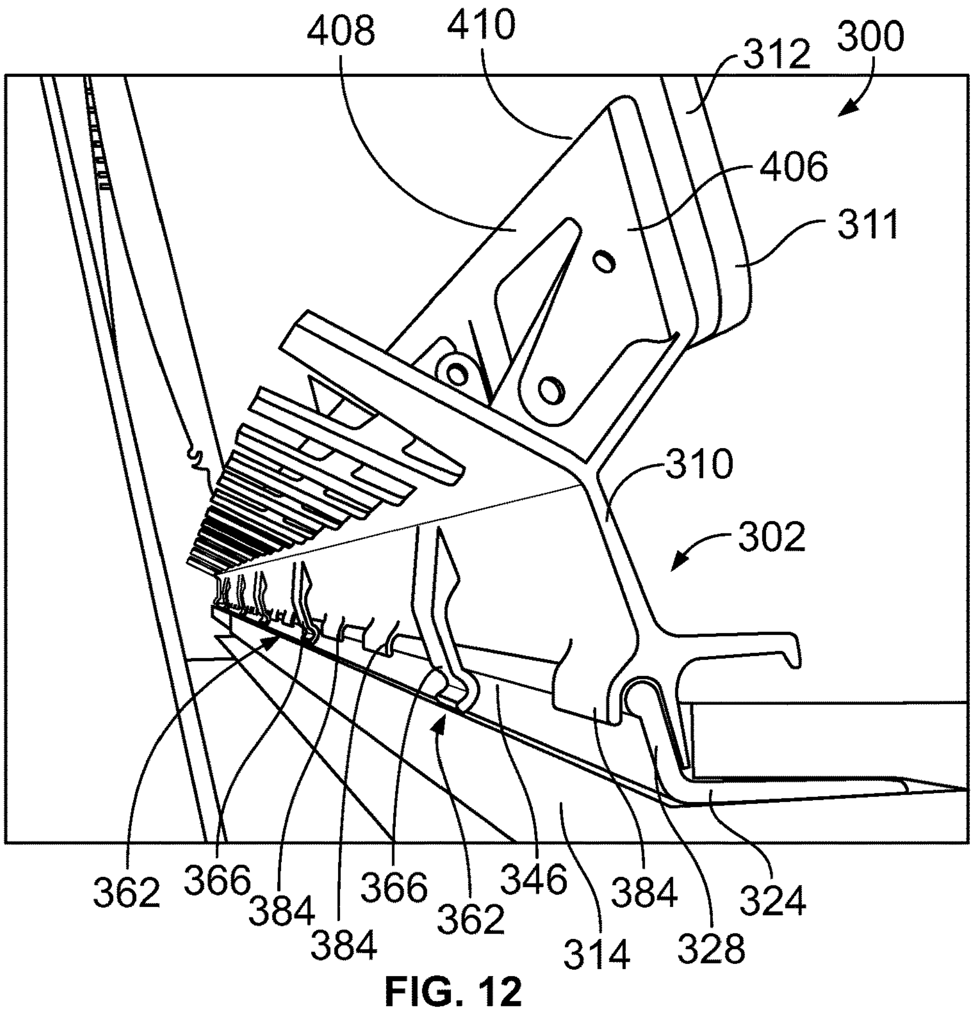
FIG. 12 is an isometric view of the vehicle cabin showing the sidewall coupling structure of the sidewall floor coupling assembly coupled to the floor coupling structure according to the embodiment of FIGS. 11A and 11B.

FIG. 12 is an isometric view of the vehicle cabin 300 showing the sidewall coupling structure 310 of the assembly 302 coupled to the floor coupling structure 324 according to the embodiment shown in FIGS. 11A and 11B. In an embodiment, the sidewall coupling structure 310 includes a plurality of the friction-fit portions 362 and a plurality of the alignment features 384. For example, the sidewall coupling structure 310 has multiple deflectable arms 366. The friction-fit portions 362 (e.g., deflectable arms 366) and the alignment features 384 are spaced apart along a length of the sidewall coupling structure 310. Each of the friction-fit portions 362 and the alignment features 384 engage the sidewall interface portion 328 of the floor coupling structure 324, as described above with respect to FIG. 11. Optionally, at least some of the friction-fit portions 362 are disposed between the alignment features 384.

To disassemble the sidewall floor coupling assembly 302 from the coupled state shown in FIG. 12, the sidewall coupling structure 310 may be lifted in a direction away from the floor panel 314. For example, the sidewall coupling structure 310 may be lifted upward with sufficient force to overcome the frictional forces between the friction-fit portions 362 (e.g., the deflectable arms 366) and the catch surface 346 of the sidewall interface portion 328. Optionally, the base portion 360 may define small slots therethrough that align with the deflectable arms 366. The slots are sized to accommodate a poking tool. To release a deflectable arm 366, the tool is inserted from the inboard side into the slot to push the deflectable arm 366 in the outboard direction, and then the sidewall coupling structure 310 is lifted upward while the one or more deflectable arms 366 are deflected.

Figure 13:
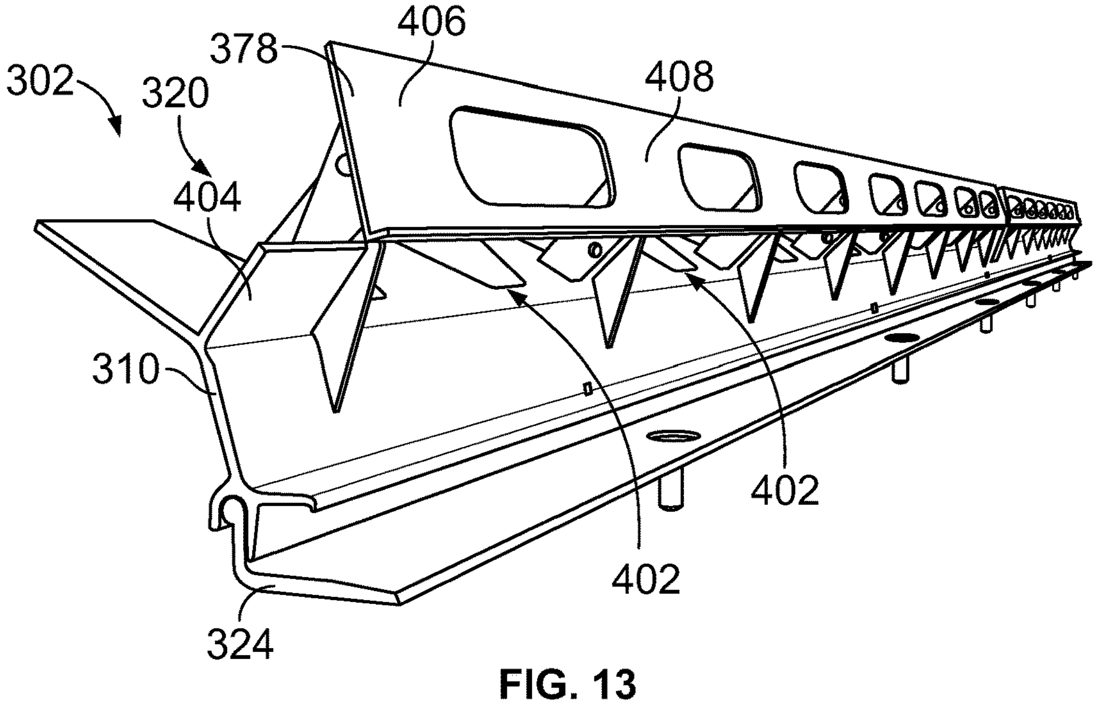
FIG. 13 is an isolated, isometric view of an inboard side of the sidewall floor coupling assembly according to an embodiment.

FIG. 13 is an isolated, isometric view of an inboard side of the sidewall floor coupling assembly 302 according to an embodiment. The sidewall coupling structure 310 is shown coupled to the floor coupling structure 324. The sidewall coupling structure 310 has a sidewall attachment section 378 that couples to the dado assembly 312 (shown in FIG. 12) of the sidewall assembly. In the illustrated embodiment, the sidewall coupling structure 310 is at least one airbridge frame 320. The airbridge frame 320 comprises openings that define return air slots 402 to facilitate passage of air during operation of the vehicle. For example, the return air slots 402 may facilitate extracting air from the cabin and directing the air towards an environmental control system (ECS) (e.g. a heating and air conditioning system) onboard the vehicle for conditioning the air.

In an embodiment, the at least one airbridge frame 320 includes a lower airbridge frame 404 and an upper airbridge frame 406 that is coupled to the lower airbridge frame 404. The upper airbridge frame 406 may represent or define the sidewall attachment section 378 that couples to the dado assembly 312. For example, as shown in FIG. 12, the dado panel 311 of the dado assembly 312 is mounted to the upper airbridge frame 406. The upper airbridge frame 406 includes a bracket 408 for engaging an outboard side 410 (shown in FIG. 12) of the dado panel 311. In an embodiment, the dado assembly 312 also includes the air grills 322 shown in FIG. 6. Alternatively, another component of the dado assembly 312 may be mounted to the bracket 408, such as the air grills 322, a separate airbridge frame, a kick plate, or the like.

Figure 14:
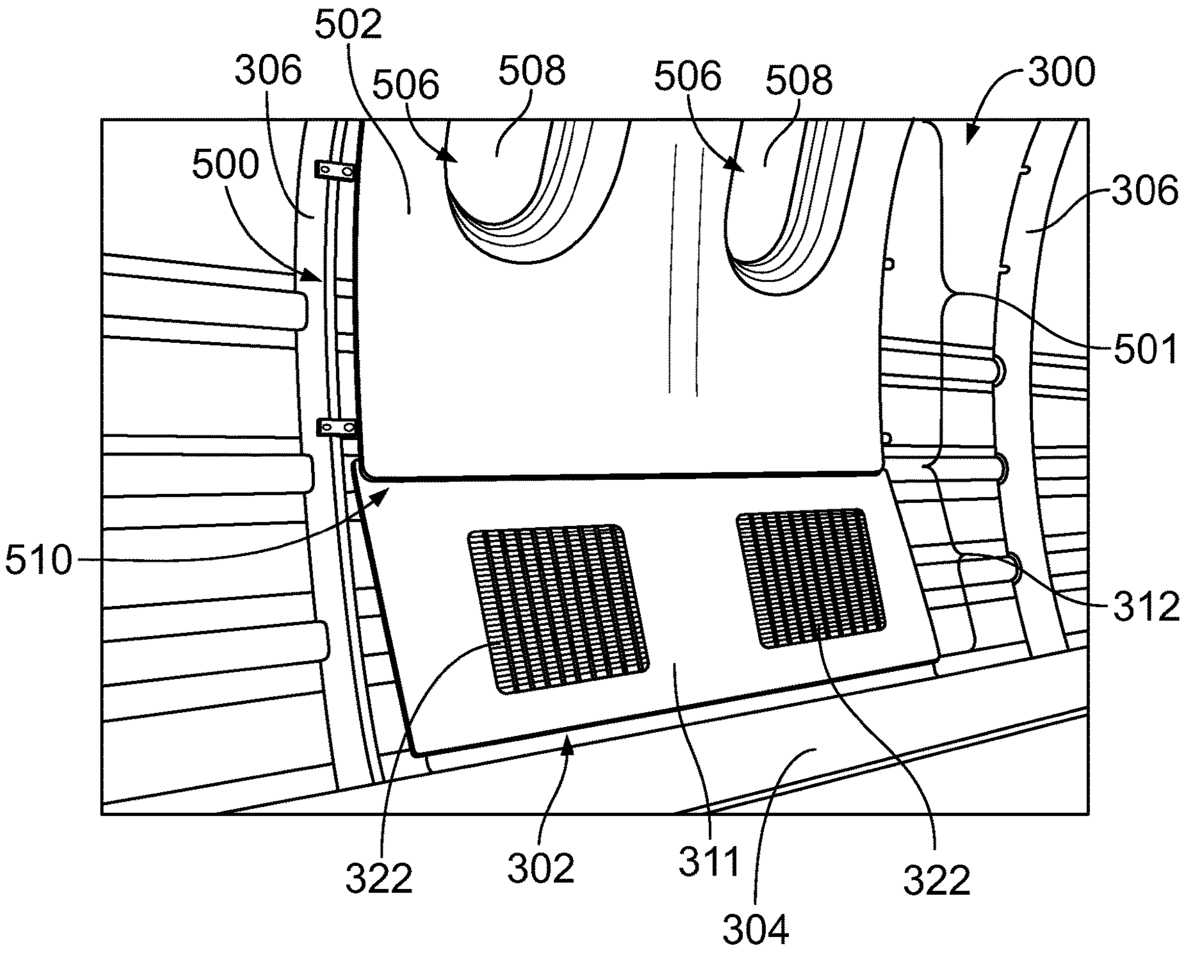
FIG. 14 is an isometric view of a sidewall panel assembly according to the embodiment of FIG. 6.

FIG. 14 is an isometric view of a sidewall assembly 500 according to an embodiment. The sidewall assembly 500 may be coupled to the sidewall coupling structure 310 of the sidewall floor coupling assembly 302 shown in FIG. 12. The sidewall assembly 500 includes an upper sidewall assembly 501 and the lower sidewall, or dado, assembly 312. The dado assembly 312 includes at least the air grills 322 and the dado panel 311, and optionally includes one or more airbridge frames, kick plates, and/or the like. The dado panel 311 is mounted to the sidewall coupling structure 310 of the assembly 302 as shown in FIG. 12. The upper sidewall assembly 501 may include a sidewall panel 502 and multiple window reveal assemblies 506 that hold windows 508. The sidewall panel 502 may be secured in a fixed position to the structural elements 306 of the cabin 300. For example, the sidewall panel 502 may be mounted to stringers, such that the sidewall panel 502 does not move relative to the stringers.

At least a majority of the dado assembly 312 is disposed between the upper sidewall assembly 501 and the floor assembly 304 (as well as the coupling assembly 302). For example, the dado panel 311 may slightly overlap the sidewall panel 502. In an embodiment, the dado assembly 312, including the sidewall coupling structure 310, is movably coupled to the upper sidewall assembly 501 via slip joints at an interface 510 between the sidewall panel 502 and the dado panel 311. Each of the slip joints includes a slot that permits a defined amount of movement along the length of the slot. The slip joints enable the dado assembly 312 limited movement towards and away from the floor assembly 304. During assembly, the dado assembly 312 may be in a lifted or raised state while the floor coupling structure 324 is attached to the floor assembly 304.

Once the floor coupling structure 324 and the sidewall coupling structure 310 are ready for coupling to one another, the dado assembly 312 is then moved, according to the slip joints, relative to the upper sidewall assembly 501 and the floor assembly 304 to a lowered state. This movement of the dado assembly 312 permits the coupling of the sidewall coupling structure 310 and the floor coupling structure 324, as described herein. Optionally, the sidewall floor coupling assembly 302 may absorb forces to reduce or minimize the loads transferred from the floor assembly 304 to the sidewall assembly 500 during operation of the vehicle.

Figure 15:
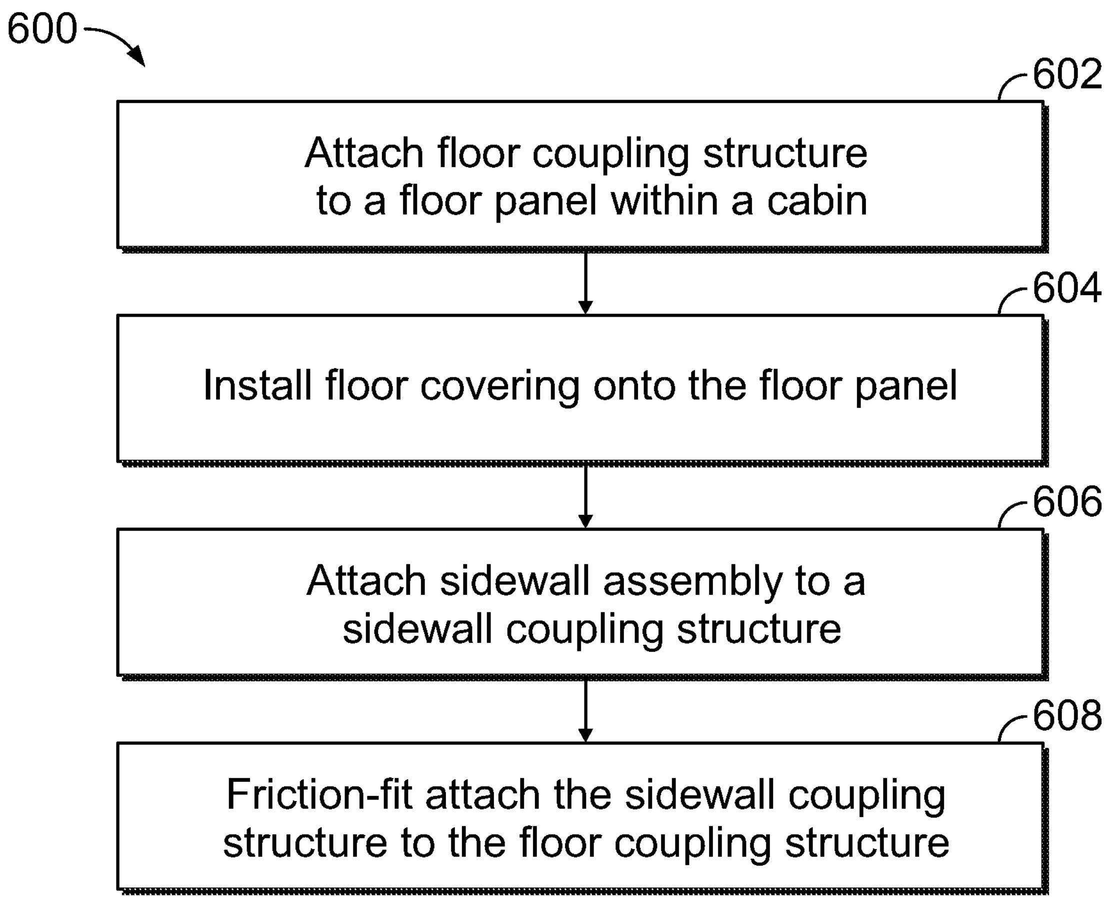
FIG. 15 is a flow chart of a method for assembling a vehicle cabin according to an embodiment.

FIG. 15 is a flow chart 600 of a method for assembling a vehicle cabin according to an embodiment. The vehicle in at least one embodiment is an aircraft, but also can be applied to other types of vehicles. The method may include more steps, fewer steps, and/or different steps than shown in the flow chart 600. Furthermore, the steps of the method may be performed in a different order than the chronological order presented in FIG. 15 unless specified. The method includes, at 602, attaching a floor coupling structure 324 to a floor panel 314 within a cabin 300. For example, a floor interface portion 326 of the floor coupling structure 324 may be attached to the floor panel 314 via fasteners, adhesive, or the like.

At 604, a floor covering 316 is installed onto the floor panel 314. The floor covering 316 may at least partially cover the floor interface portion 326 of the floor coupling structure 324. At 606, a sidewall assembly 500 is attached to a sidewall coupling structure 310. The sidewall assembly 500 may include an upper sidewall assembly 501 and a dado assembly 312. The dado assembly 312 may include a dado panel 311 that is attached to the sidewall coupling structure 310. The dado panel 311 may be moveably coupled to a sidewall panel 502 of the upper sidewall assembly 501 via one or more slip joints. The sidewall panel 502 may be coupled to at least one window reveal assembly 506. The upper sidewall assembly 501 may be coupled to structural elements 306 of the cabin 300. The structural elements 306 may be frame members of the fuselage, such as stringers.

At 608, the sidewall coupling structure 310 is friction-fit attached to the floor coupling structure 324. The friction-fit attaching may be tool-less, meaning that it is performed without the use of hand tools or machinery to fasten. The friction-fit attaching may be fastener-less, such that no bolts, screws, rivets, or scrivets, or installed between the sidewall coupling structure 310 and the floor coupling structure 324. The sidewall coupling structure 310 may include at least one deflectable arm 366 that is attached to a base portion 360 of the sidewall coupling structure 310. The floor coupling structure 324 may include a sidewall interface portion 328. The friction-fit attaching operation may include moving the dado assembly 312, with the sidewall coupling structure 310, towards the sidewall interface portion 328 of the floor coupling structure 324 such that a distal end 344 of the sidewall interface portion 328 is received between the at least one deflectable arm 366 and the base portion 360. The friction-fit attaching may include snap-fitting the at least one deflectable arm 366 onto the sidewall interface portion 328.

As described herein, the vehicle cabin floor-to-sidewall assembly and method of assembly are configured to provide a tool-less, friction-fit coupling that connects the floor panel to the sidewall panel assembly, which increases installation efficiency. The floor-to-sidewall assembly may provide weight savings and increased operational lifetime compared to conventional floor-to-sidewall connections. Optionally, the assembly may minimize or reduce load transfer between the floor and the sidewall. The floor-to-sidewall assembly may be installed within a cabin of an aircraft or another type of vehicle.

Clause 1: An assembly for use in a vehicle cabin, comprising a floor coupling structure comprising a floor interface portion and a sidewall interface portion that extends transversely relative to the floor interface portion, the floor interface portion configured to attach the floor coupling structure to a floor assembly of an internal cabin of a vehicle; and a sidewall coupling structure having at least one friction-fit portion and a sidewall attachment section, the sidewall attachment section configured to couple the sidewall coupling structure to a sidewall assembly of the internal cabin, and the at least one friction-fit portion configured to couple to the sidewall interface portion of the floor coupling structure.

Clause 2. The assembly of Clause 1, wherein the sidewall interface portion of the floor coupling structure includes a catch surface along an outboard side of the sidewall interface portion, the at least one friction-fit portion of the sidewall coupling structure including a deflectable arm configured to latch onto the catch surface to couple to the sidewall interface portion.

Clause 3. The assembly of Clause 1 or Clause 2, wherein the sidewall coupling structure includes a flange configured to overlap the sidewall interface portion of the floor coupling structure and abut against an inboard side of the sidewall interface portion when the at least one friction-fit portion is coupled to the sidewall interface portion.

Clause 4. The assembly of any of Clauses 1-3, wherein the floor coupling structure comprises a unitary and generally L-shaped body defined by the floor interface portion and the sidewall interface portion, the floor interface portion configured to extend along a floor covering support surface of a floor panel of the floor assembly and attach to the floor panel.

Clause 5. The assembly of any of Clauses 1-4, wherein the sidewall coupling structure includes at least one alignment feature that defines a channel sized and shaped to accommodate a distal end of the sidewall interface portion of the floor coupling structure, such that an inner surface of the alignment feature abuts the distal end of the sidewall interface portion when coupled together.

Clause 6. The assembly of Clause 5, wherein the sidewall coupling structure includes a plurality of the friction-fit portions and a plurality of the alignment features, the plurality of the friction-fit portions and the plurality of the alignment features spaced apart along a length of the sidewall coupling structure.

Clause 7. The assembly of any of Clauses 1-6, wherein the floor assembly comprises a floor panel and a floor covering disposed on a floor covering support surface of the floor panel, wherein the sidewall coupling structure comprises a ledge configured to extend above and overlap a portion of the floor covering such that an edge of the floor covering is disposed within a space between the ledge and the floor interface portion of the floor coupling structure.

Clause 8. The assembly of any of Clauses 1-7, wherein the at least one friction-fit portion includes a deflectable arm that has a fixed end and a free end, the fixed end being attached to a base portion of the sidewall coupling structure, the fixed end located between the free end and the sidewall attachment section of the sidewall coupling structure.

Clause 9. The assembly of any of Clauses 1-8, wherein the sidewall coupling structure defines a return air slot to facilitate passage of air during operation of the vehicle.

Clause 10. The assembly of any of Clauses 1-9, wherein the vehicle is an aircraft, and wherein the sidewall coupling structure and the floor coupling structure are respective ones of a plurality of sidewall coupling structures and a plurality of floor coupling structures of the assembly coupled together along first and second sides of the internal cabin.

Clause 11. An aircraft, comprising:

a fuselage including an internal cabin;

a sidewall assembly within the internal cabin;

a floor panel within the internal cabin;

a floor coupling structure attached to the floor panel; and a sidewall coupling structure attached to the sidewall assembly, the sidewall coupling structure friction-fit coupled to the floor coupling structure to couple together the floor coupling structure and the sidewall assembly.

Clause 12. The aircraft of Clause 11, wherein the sidewall assembly includes a dado assembly and an upper sidewall assembly, the upper sidewall assembly including a sidewall panel that is coupled to a dado panel of the dado assembly via a slip joint, wherein the sidewall panel is attached to the fuselage, and the sidewall coupling structure is mounted to the dado panel.

Clause 13. The aircraft of Clause 11 or Clause 12, wherein the floor coupling structure comprises a floor interface portion and a sidewall interface portion that extends transversely relative to the floor interface portion, the floor interface portion attached to the floor panel, wherein the sidewall coupling structure comprises at least one friction-fit portion that is coupled to the sidewall interface portion of the floor coupling structure via a friction fit coupling configuration.

Clause 14. The aircraft of any of Clauses 11-13, wherein the floor coupling structure and the sidewall coupling structure are coupled together without the use of hand tools or machinery.

Clause 15. The aircraft of any of Clauses 11-14, wherein the floor coupling structure and the sidewall coupling structure are coupled together without fasteners.

Clause 16. A method of assembling a vehicle cabin, the method comprising:

attaching a floor coupling structure to a floor panel of an internal cabin of a vehicle; and friction-fit attaching a sidewall coupling structure to the floor coupling structure.

Clause 17. The method of Clause 16, wherein the friction-fit attaching of the sidewall coupling structure to the floor coupling structure is tool-less and fastener-less.

Clause 18. The method of Clause 16 or Clause 17, further comprising: attaching a dado panel of a dado assembly to the sidewall coupling structure; and attaching a sidewall panel to the dado panel at a slip joint.

Clause 19. The method of any of Clauses 16-18, wherein attaching the floor coupling structure to the floor panel includes attaching a floor interface portion of the floor coupling structure to the floor panel, and the method further comprises installing a floor covering onto the floor panel and the floor interface portion.

Clause 20. The method of any of Clauses 16-19, wherein friction-fit attaching the sidewall coupling structure to the floor coupling structure comprises snap-fitting at least one deflectable arm of the sidewall coupling structure to the floor coupling structure system.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

As used herein, approximating value modifiers such as "about," "substantially," "generally," and "approximately" inserted before a numerical value indicate that the value can represent other values within a designated threshold range above and/or below the specified value without resulting in a change in the basic function to which it may be related. Accordingly, a value modified by a term or terms, such as "about," "substantially," "generally," and "approximately," may be not to be limited to the precise value specified. The approximating terms may indicate inclusion of values within a designated threshold margin of the precise value. The threshold margin may be plus/minus 3% of the precise value, plus/minus 5% of the precise value, plus/minus 10% of the precise value, or the like. Two items or axes that are generally parallel can be angled within 3 degrees of each other in one example, within 5 degrees of each other in a second example, and within 10 degrees of each other in a third example.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:

a floor assembly;

a sidewall assembly; and an assembly comprising:

a floor coupling structure comprising a floor interface portion and a sidewall interface portion that extends transversely relative to the floor interface portion, wherein the floor interface portion directly attaches the floor coupling structure to the floor assembly, wherein the floor interface portion is flat and attaches to and overlays a portion of a floor panel of the floor assembly;

a sidewall coupling structure having at least one friction-fit portion and a sidewall attachment section, wherein the sidewall interface portion projects upwardly from the floor interface portion, wherein the sidewall attachment section couples the sidewall coupling structure to the sidewall assembly, and wherein the at least one friction-fit portion couples to the sidewall interface portion of the floor coupling structure; and a transition portion that connects the floor interface portion to the sidewall interface portion.

2. The system of claim 1, wherein the sidewall coupling structure includes a flange that overlaps the sidewall interface portion of the floor coupling structure and abuts against an inboard side of the sidewall interface portion when the at least one friction-fit portion is coupled to the sidewall interface portion.

3. The system of claim 1, wherein the floor coupling structure comprises a unitary and generally L-shaped body defined by the floor interface portion and the sidewall interface portion, and wherein the floor interface portion extends along a floor covering support surface of a floor panel of the floor assembly and attaches to the floor panel.

4. The system of claim 1, wherein the sidewall coupling structure includes at least one alignment feature that defines a channel sized and shaped to accommodate a distal end of the sidewall interface portion of the floor coupling structure, such that an inner surface of the alignment feature abuts the distal end of the sidewall interface portion when coupled together.

5. The system of claim 4, wherein the sidewall coupling structure includes a plurality of the friction-fit portions and a plurality of the alignment features, the plurality of the friction-fit portions and the plurality of the alignment features spaced apart along a length of the sidewall coupling structure.

6. The system of claim 1, wherein the floor assembly comprises a floor panel and a floor covering disposed on a floor covering support surface of the floor panel, wherein the sidewall coupling structure comprises a ledge that extends above and overlaps a portion of the floor covering such that an edge of the floor covering is disposed within a space between the ledge and the floor interface portion of the floor coupling structure.

7. The system of claim 1, wherein the at least one friction-fit portion includes a deflectable arm that has a fixed end and a free end, the fixed end being attached to a base portion of the sidewall coupling structure, the fixed end located between the free end and the sidewall attachment section of the sidewall coupling structure.

8. The system of claim 1, wherein the sidewall coupling structure defines a return air slot to facilitate passage of air during operation of a vehicle.

9. The system of claim 1, wherein the system is an aircraft, and wherein the sidewall coupling structure and the floor coupling structure are respective ones of a plurality of sidewall coupling structures and a plurality of floor coupling structures of the assembly coupled together along first and second sides of an internal cabin of the aircraft.

10. The system of claim 1, wherein the sidewall interface portion comprises a bulbous head at a distal end, wherein the bulbous head is thicker than a portion of the sidewall interface portion between the bulbous head and the transition portion.

11. An aircraft, comprising:

a fuselage including an internal cabin;

a sidewall assembly within the internal cabin;

a floor panel within the internal cabin;

a floor coupling structure directly attached to the floor panel, wherein the floor coupling structure comprises:

a floor interface portion directly attached to the floor panel;

a sidewall interface portion that extends transversely relative to the floor interface portion, wherein the sidewall interface portion projects upwardly from the floor interface portion; and a transition portion that connects the floor interface portion to the sidewall interface portion, wherein the floor interface portion is flat and attaches to and overlays a portion of the floor panel; and a sidewall coupling structure attached to the sidewall assembly, the sidewall coupling structure friction-fit coupled to the floor coupling structure, thereby coupling together the floor coupling structure and the sidewall assembly.

12. The aircraft of claim 11, wherein the sidewall assembly includes a dado assembly and an upper sidewall assembly, the upper sidewall assembly including a sidewall panel that is coupled to a dado panel of the dado assembly via a slip joint, wherein the sidewall panel is attached to the fuselage, and the sidewall coupling structure is mounted to the dado panel.

13. The aircraft of claim 11, wherein the sidewall coupling structure comprises at least one friction-fit portion that is coupled to the sidewall interface portion of the floor coupling structure via a friction fit coupling configuration.

14. The aircraft of claim 11, wherein the floor coupling structure and the sidewall coupling structure are coupled together without the use of hand tools or machinery.

15. The aircraft of claim 11, wherein the floor coupling structure and the sidewall coupling structure are coupled together without separate and discrete fasteners.

16. A method of assembling a vehicle cabin, the method comprising:

directly attaching a floor coupling structure to a floor panel of an internal cabin of a vehicle, wherein the floor coupling structure comprises a floor interface portion and a sidewall interface portion that extends transversely relative to the floor interface portion, wherein the floor interface portion is flat and attaches to and overlays a portion of the floor panel; and friction-fit attaching a sidewall coupling structure to the floor coupling structure, wherein the sidewall coupling structure has at least one friction-fit portion and a sidewall attachment section, wherein the sidewall interface portion projects upwardly from the floor interface portion.

17. The method of claim 16, wherein the friction-fit attaching of the sidewall coupling structure to the floor coupling structure is tool-less and without the use of separate and discrete fasteners.

18. The method of claim 16, further comprising:

attaching a dado panel of a dado assembly to the sidewall coupling structure; and attaching a sidewall panel to the dado panel at a slip joint.

19. The method of claim 16, wherein directly attaching the floor coupling structure to the floor panel includes directly attaching a floor interface portion of the floor coupling structure to the floor panel, and the method further comprises installing a floor covering onto the floor panel and the floor interface portion.

20. The method of claim 16, wherein friction-fit attaching the sidewall coupling structure to the floor coupling structure comprises snap-fitting at least one deflectable arm of the sidewall coupling structure to the floor coupling structure.

* * * * *